United States Patent [19]

Torstensson

[11] 4,153,259
[45] May 8, 1979

[54] SHAFT SEALING ARRANGEMENT
[75] Inventor: Tommy Torstensson, Forsheda, Sweden
[73] Assignee: Forsheda Gummifabrik AB, Forsheda, Sweden
[21] Appl. No.: 772,866
[22] Filed: Feb. 28, 1977
[51] Int. Cl.² ............................................. F16J 15/40
[52] U.S. Cl. ................................................... 277/75
[58] Field of Search ................................. 277/3, 27, 75
[56] References Cited

U.S. PATENT DOCUMENTS

| 3,021,146 | 2/1962 | Sommer et al. | 277/3 |
| 3,088,744 | 5/1963 | Ezekiel et al. | 277/3 |
| 3,514,113 | 5/1970 | Weiswurm | 277/3 |
| 4,013,298 | 3/1977 | Bjerk | 277/75 |
| 4,021,050 | 5/1977 | Powers | 277/75 |

Primary Examiner—Robert I. Smith
Attorney, Agent, or Firm—Eugene E. Renz, Jr.

[57] ABSTRACT

A seal device is provided for sealing the annular space between a machine element and a rotating shaft. The seal comprises a annular chamber in a housing which opens inwardly toward the shaft. An annular seal element of elastomeric material engages the walls of the chamber and a sleeve mounted on the shaft. Means are provided to supply fluid to the space between the seal element and sleeve to selectively more the same out of contact.

7 Claims, 1 Drawing Figure

U.S. Patent      May 8, 1979      4,153,259
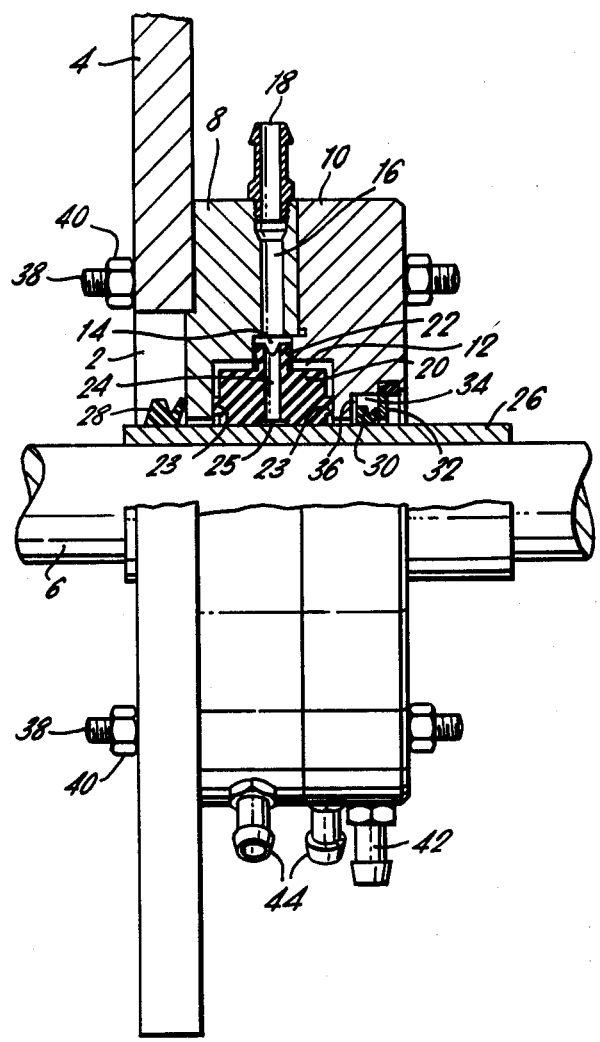

SHAFT SEALING ARRANGEMENT

The present invention relates to a device for sealing an annular opening between two machine elements, preferably for sealing an opening formed in a wall, a rotatable shaft extending through said opening.

The Swedish Patent Specification No. 356,112 describes a sealing device intended for complicated sealing cases, such as for sealing in polluted atmosphere containing strongly abrasive particles and for sealing shaft passages wherein the difference of the pressures at each side of the wall through which the shaft extends is considerable. Said sealing device comprises a sealing element consisting of a sleeve enclosing the shaft and consisting of an elastic material, preferably rubber, said sleeve sealingly engaging the wall through which the shaft extends. The shaft is formed with one or more channels for supplying pressure fluid to the contact surfaces between the sleeve and the shaft, said contact surfaces being supplied with a fluid of such pressure that the sleeve moves away form contact with the shaft for forming a clearance space between sleeve and shaft when the shaft is rotated, the supplied pressure fluid escaping through the clearance space thus formed to the spaces at each side of the sleeve.

As mentioned above, said sealing device is intended for complicated sealing cases, and the device has an extremely good function. However, it is one drawback that it might be complicated and require a laborious work to apply the sealing device in constructions already present. Thus, it is necessary to provide in the construction channels for supplying pressure fluid, and it can also present considerable problems to prevent abrasive particles and dirt from entering into the space between the shaft of the construction and the sealing element of the sealing device when mounting the sealing device in the polluted atmosphere which is usually present where the sealing device shall be used.

The object of the present invention is to provide a sealing device which obviates the above drawbacks.

In order to comply with said object, the sealing device according to the invention comprises a housing in which the sealing element is positioned, said housing being sealingly connectable with a first machine element and sealingly engaging the sealing element, and further comprising a sleeve extending through said housing, the outer surface of the sleeve engaging the surface of the sealing element, which is adapted to be supplied with pressure fluid, and the inner surface of the sleeve being adapted sealingly to engage another machine element when the sleeve is positioned thereon.

Thus, the sealing device according to the invention constitutes a unit which in a simple manner can be included in a construction already present. When the sealing device according to the invention shall seal an opening in a wall, through which opening there extends a shaft, it is only necessary tightly to fasten the housing against the wall, the housing having before that been pushed onto the shaft by pushing the sleeve over said shaft. Even if the mounting of the sealing device takes place in a very polluted atmosphere, no pollution of the sensitive parts of the sealing device can take place as the sealing element is completely enclosed by the housing and the sleeve during the mounting. Furthermore, the mounting is very easy to provide as there in only required a fastening of the housing to a wall and connection of a hose for pressure fluid to the housing which is preferably provided with fittings for making the connection easier to provide.

The invention is described in the following with reference to the accompanying drawing which partly in section shows a device according to the invention.

The sealing device according to the embodiment of the invention shown in the drawing is adapted for sealing an annular opening 2 between a surface forming an opening in a wall 4 and a shaft 6 extending through said opening. The sealing device comprises a housing consisting of two parts 8 and 10. The housing is of annular shape and is formed with an annular central chamber 12. The chamber 12 is formed with a peripheral depression 14 into which there extends a channel 16 provided in the portion 8 of the housing. At its opposite end in relation to the chamber 12, the channel 16 is provided with a connection fitting 18 screwed into the protion 8 of the housing. In the chamber 12 there is provided an annular sealing element 20 having a central outwardly extending flange 22 extending into the depression 14 of the chamber 12. The sealing element 20 is provided at its side surfaces with annular projections 23 sealingly engaging the side walls of the chamber 12. The sealing element 20 is provided with at least one channel 24 extending radially through the sealing element from the depression 14 to an annular cavity 25 at the inner surface of the sealing element.

A sleeve 26 is centrally positioned in the housing 8, 10, and the sealing element is positioned around this sleeve at a certain pretensioning. Each clearance space between the portions 8 and 10 of the housing at one side and the sleeve 26 at the other side is at one side of the sealing element 20 sealed by means of a sealing ring 28 and at the other side of the sealing element 20 sealed by means of a sealing ring 30 and an annular washer 32. The sealing ring 28 is tensioned on to the sleeve 26 and is provided with a lip contacting the side surface of the portion 8 of the housing. A lip of the sealing ring 30 contacts the washer 32 positioned in the portion 10 of the housing. The space 34 in which the sealing ring 30 is positioned in the portion 10 of the housing is connected with the inner portion of the housing by the fact that said space 34 is at its side surface adjacent the sealing element provided with one or more channels 36.

The housing 8, 10 including the sealing element 20, the sleeve 26 and the sealing arrangements between the sleeve and the housing constitute a sealing unit which in a simple manner can be connected with the wall 4 and the shaft 6 extending through said wall in order to seal the annular opening 2. Thus, the sealing unit is pushed onto the shaft 6 with the sleeve 26 positioned around the shaft 6 to a position wherein the portion 8 of the housing engages the wall 4 around the opening 2. The housing 8, 10 is connected with the wall 4 by means of bolts 38 and nuts 40. The fitting 18 is connected with a pressure fluid source, for example water under pressure. Concurrently with the starting of the rotation of the shaft 6 the sealing device is supplied with pressure fluid through the fitting 18, the channel 16 and the channel 24 in the sealing element 20. Thus, the surface between the sealing element 20 and the sleeve 26 is supplied with a pressure fluid which causes the sealing element 20 at the surface contacting the sleeve 26 to lift a short distance therefrom so that there is provided a small clearance space between the sealing element 20 and the sleeve 26. The pressure of the pressure fluid thus supplied is greater than the pressure at each side of the sealing device so that the pressure fluid will escape from both sides of the sealing element 20 through the clearance space thus formed. At the left side of the sealing element the pressure fluid is allowed directly to escape to the space to the left of the wall 4 by the fact that the lip of the sealing ring 28 is lifted out of contact with the portion 8 of the housing by the pressure fluid. In this case the construction is of such kind that the supply of pressure fluid to said space does not have any harmful influence on the construction. The pressure fluid excaping to the right according to the drawing from the sealing element 20 arrives to the space 34 through the channels 36. The space 34 is sealed in the direction of the space positioned to the right of the wall 4 and the sealing device by the fact that the lip of the sealing ring 30 is pressed against the washer 32 by the pressure of the chamber 34. The chamber 34 is provided with a draining channel (not shown), extending radially outwards through the portion 10 of the housing from the space 34 to a connection fitting 42 to which a hose can be connected for draining the pressure fluid away in the desired way.

As shown in the drawing, the portions 8 and 10 of the housing are provided with two further connection fittings 44 connected with one end of each of two radially extending channels (not shown) in the housing, said channels opening into the chamber 12 at the outer surface of the sealing element 20 at each side of the flange 24 of the sealing element. The channels connected with the fittings 44 can be supplied with a pressure fluid acting on the outer surface of the sealing element. Thus, such pressure fluid acts for pressing the sealing element against the sleeve 26. This provides for a further possibility of controlling the position of the sealing element 20 in relation to the sleeve 26.

With regard to the manufacturing as well as with regard to the function it is advantageous to manufacture the housing 8, 10 as well as the sleeve 26 from a plastic material, preferably polyethylene. It is preferred to manufacture the housing 8, 10 from two portions, as is shown in the drawing, said portions being sealingly connected with each other.

It appears from the above description that it is by means of a sealing device according to the invention extremely easy to provide sealing of an annular opening between two machine elements. Expecially when the mounting is take place in polluted atmosphere the sealing device according to the invention offers great advantages. The sealing element 20 is completely enclosed by the housing and no dirt can come into the space between the sealing element 20 and the opposite surface together with which the sealing element shall cooperate. In the previously known mounting of sealing element of the kind described above, the sealing element has cooperated directly with the shaft which in polluted atmosphere has caused considerably difficulties to get rid of dirt particles from the contact surface.

The invention can be modified within the scope of the following claims.

I claim:

1. A seal device for sealing an annular space between a machine element and a shaft rotatable in relation thereto, comprising a housing having an opening therein and an annular chamber surrounding and being at its inner periphery in open connection with said opening, an annular sealing element of an elastic material mounted in said chamber and sealingly engaging the walls thereof, a sleeve in said opening, said sealing element enclosing and sealingly engaging said sleeve, means for supplying to the opposed surfaces of said sealing element and said sleeve a fluid under pressure for expanding said sealing element and thereby separating said surfaces in order to establish a clearance space between said surfaces in the operational condition of the seal device, and means for sealingly connecting said housing with the machine element in a position where the shaft projects into said sleeve, the sleeve being adapted thereby sealingly to enclose the shaft.

2. A device as claimed in claim 1, wherein sealing rings are provided for sealing the housing in relation to the sleeve at each side of the sealing element.

3. A device as claimed in claim 1, wherein the housing is formed with channels and connection fittings for the supply and draining of the pressure fluid.

4. A device as claimed in claim 1, wherein the housing and the sleeve consists of plastic, preferably polyethylene.

5. A device as claimed in claim 1, including second channel means in said housing communicating with said chamber for supplying a pressure medium acting on the outer surface of said annular sealing element in a direction to urge said sealing element against said other machine element.

6. A seal device for sealing an annular space between at least a pair of relatively rotatable machine elements comprising a housing secured to one of said machine elements having an annular chamber therein confronting the other machine element, an annular sealing element of an elastic material mounted in said chamber having a circumferentially extending rib at each axial end face in sealing engagement with opposed axial end walls of said chamber in said one machine element said sealing element having a radially outwardly directed, circumferential flange projecting from its outer peripheral surface extending into an annular cavity in said chamber, means defining at least one radial passage in said sealing element extending from said flange to an annular undercut in the inner peripheral surface defining a cavity confronting said other machine element, means including first channel means in said housing for supplying a fluid under pressure to said cavity and seal means adjacent opposite axial ends of said housing outboard of said annular chamber in sealing engagement with said housing and said other machine element, said seal means at one end permitting escape of fluid and said seal means at the other end blocking flow of fluid.

7. A device as claimed in claim 6 wherein the seal means at one axial end of the seal housing permits the flow of pressure medium to the ambient atmosphere and the seal means at the other axial end of said housing prevents flow of pressure medium to the ambient atmosphere.